United States Patent [19]
Jeong

[11] Patent Number: 6,111,997
[45] Date of Patent: Aug. 29, 2000

[54] TUNABLE FILTERING DEVICE FOR OPTICAL COMMUNICATIONS

[75] Inventor: Tae-san Jeong, Yongin, Rep. of Korea

[73] Assignee: Samsung Electronics Co., Ltd., Kyungki-do, Rep. of Korea

[21] Appl. No.: 09/012,567

[22] Filed: Jan. 23, 1998

[30] Foreign Application Priority Data

Feb. 22, 1997 [KR] Rep. of Korea ............... 97-5470

[51] Int. Cl.[7] ............................................. G02B 6/26
[52] U.S. Cl. ........................... 385/27; 385/30; 385/24; 250/226
[58] Field of Search ............................. 385/27, 37, 12, 385/30, 24; 250/226, 339.11, 343

[56] References Cited

U.S. PATENT DOCUMENTS 5,646,399 7/1997 Fukushima et al. ............... 250/226

Primary Examiner—Phan T. H. Palmer
Attorney, Agent, or Firm—Burns Doane Swecker & Mathis L.L.P.

[57] ABSTRACT

A tunable filtering device comprising a base; first and second optical fibers aligned and facing each other; a tunable filter installed on the optical path between the first and second optical fibers, for transmitting only a beam of a specific wavelength from the beam emitted from the first optical fiber toward the second optical fiber; an actuator driving the tunable filter; a beam splitter installed on the optical path between the tunable filter and the second optical fiber, for reflecting a portion of the beam transmitted through the tunable filter and transmitting the rest; an auxiliary optical fiber installed on the base, for receiving a beam reflected from the beam splitter for further transmission; and a controller detecting the beam transmitted through the auxiliary optical fiber and controlling the actuator according to the detected beam.

10 Claims, 3 Drawing Sheets

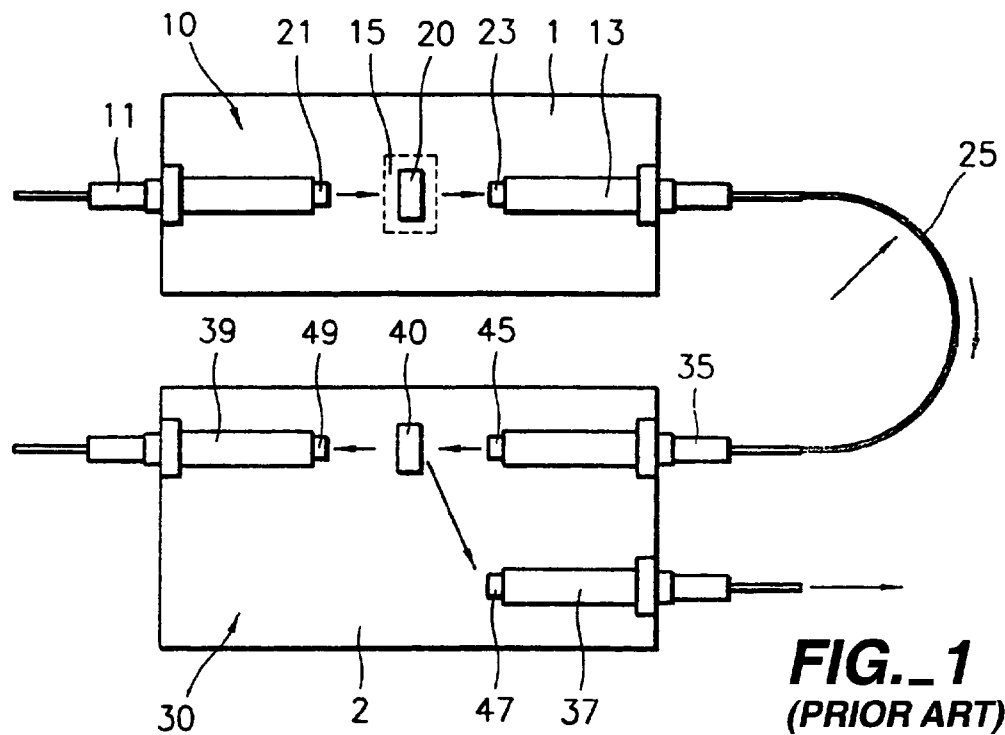
FIG._1
*(PRIOR ART)*
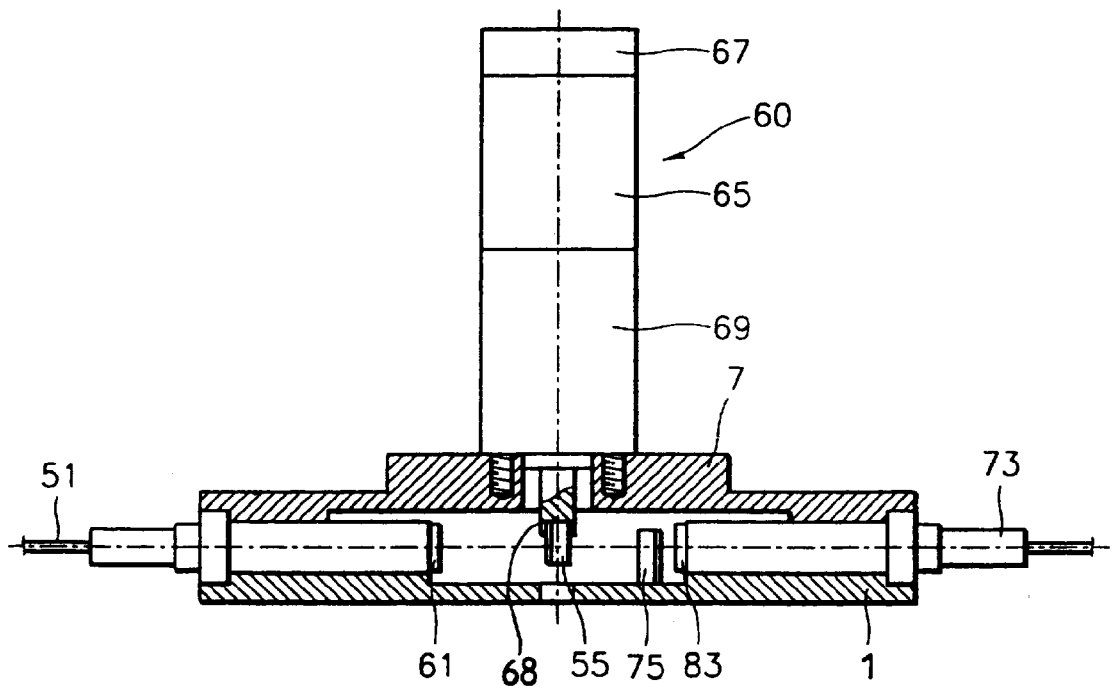
FIG._3

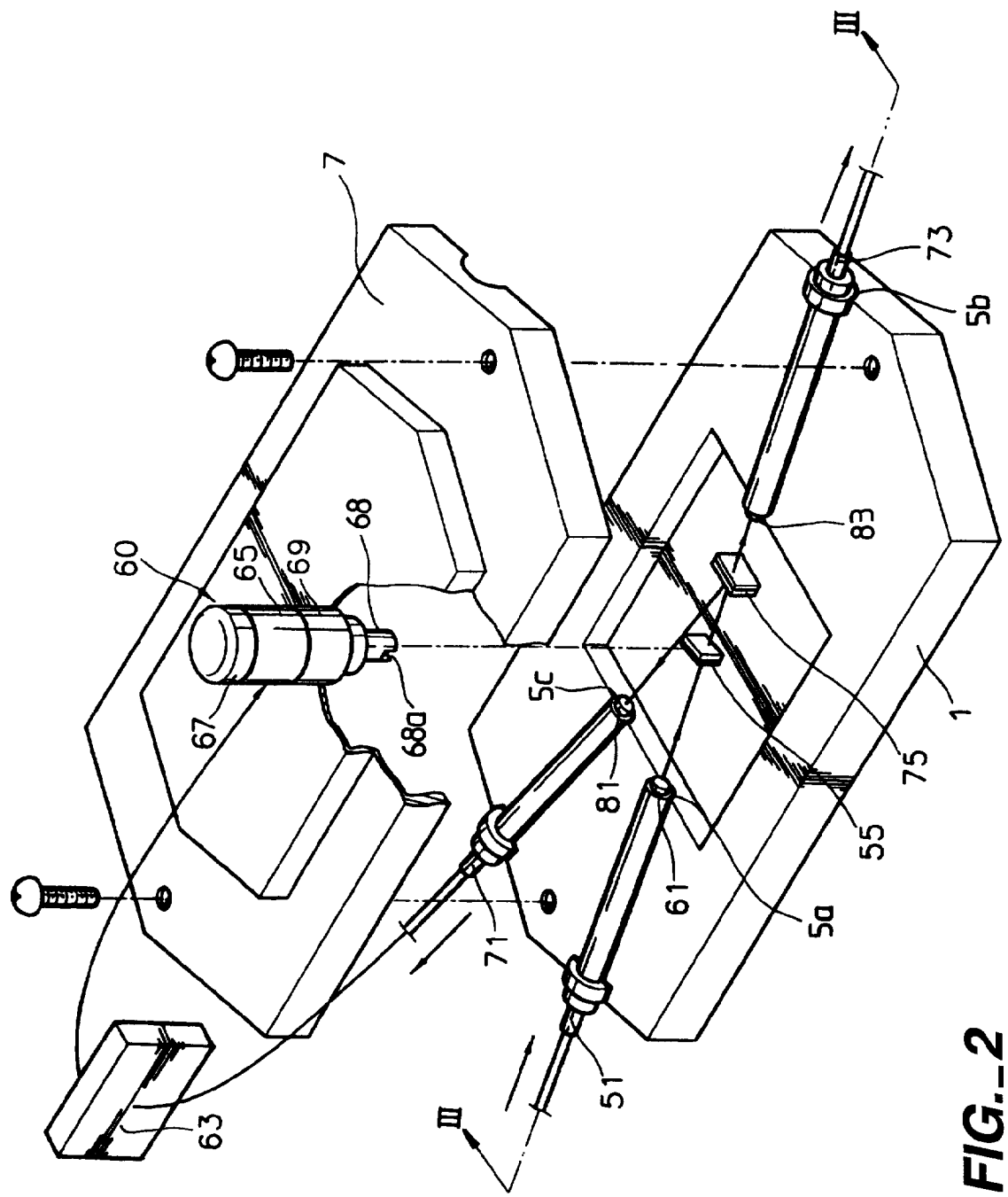
FIG._2

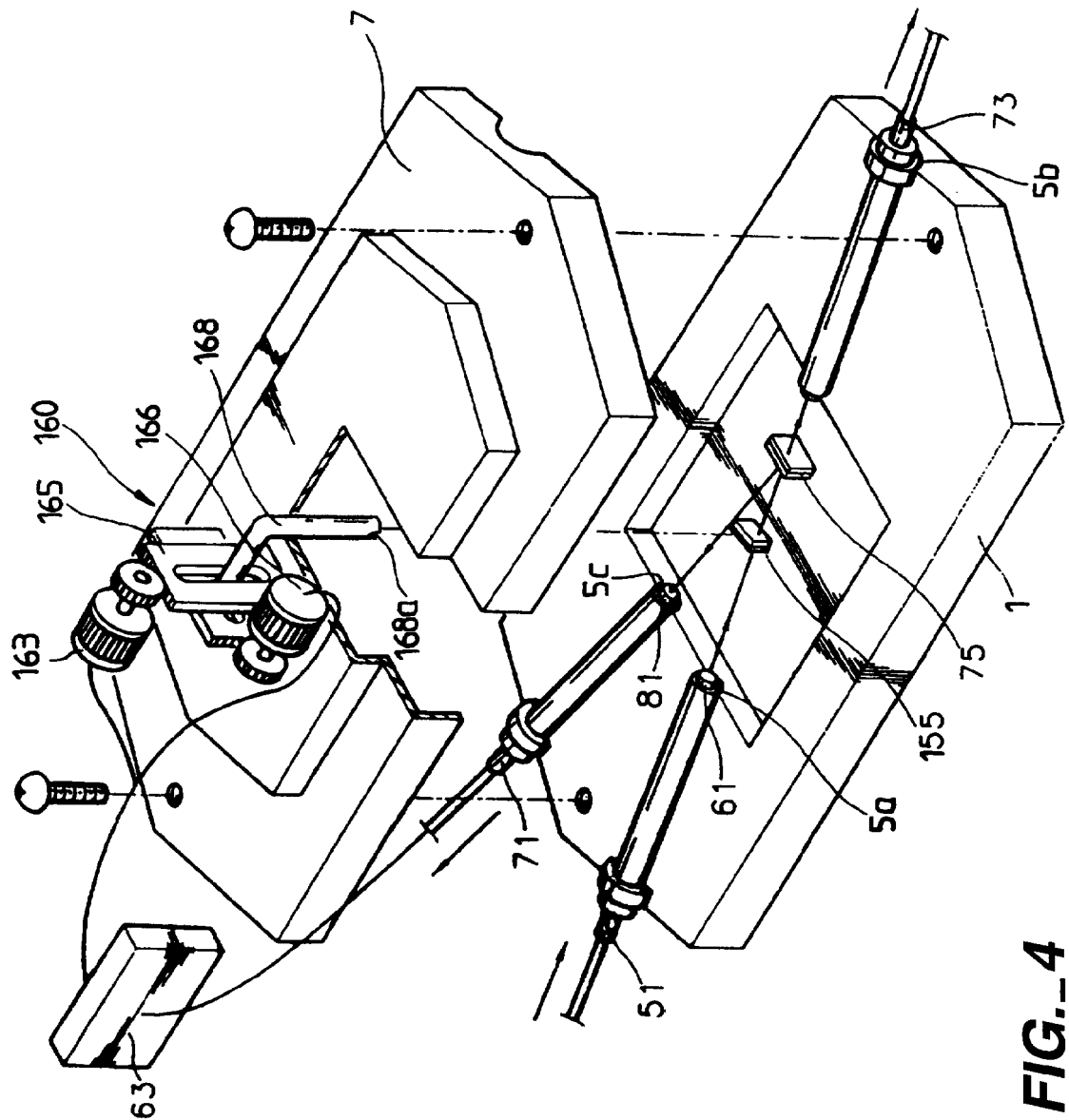
FIG._4

TUNABLE FILTERING DEVICE FOR OPTICAL COMMUNICATIONS

BACKGROUND OF THE INVENTION

1. Field of the Invention

The present invention relates to a tunable filtering device for optical communications, and more particularly, to a tunable filtering device for optical communications which can transmit a beam of a selected specific wavelength from a beam of multiple wavelength signals.

2. Description of the Related Art

In optical communications, to increase the data transmission quantity per unit time, a plurality of signals having different wavelengths which do not interfere with each other are transmitted through a single optical fiber. By doing so, communication can be performed using not only fewer communication systems as a whole, but also using fewer communication lines.

In optical communication which uses a plurality of signals of different wavelengths, it is necessary to selectively receive or detect only a signal of a specific wavelength at the receiving side, in most cases. In this case, a tunable filtering device is used to selectively transmit a beam of a specific wavelength.

Such a tunable filtering device for optical communications may be used in optical communication systems employing a wavelength division multiplexer (WDM), erbium-doped fiber amplifiers (EDFAs), or the like.

As shown in FIG. 1, a prior tunable filtering device for optical communications comprises a tunable filter unit 10 and a tap unit 30 which are installed on a first base 1 and a second base 2, respectively. The tunable filter unit 10 transmits a beam of a specific wavelength from an incident beam of various wavelengths, and the tap unit 30 splits the beam transmitted through the tunable filter unit 10, providing one of the split beams to control the tunable filter unit 10 and the other as the output.

The tunable filter unit 10 includes a line filter 20 for selectively transmitting a beam of a specific wavelength from the beam incident from a first optical fiber 11 toward a second optical fiber 13, and an actuator 15 for controlling the position of the line filter 20.

A first lens 21 collimates a divergent beam and is installed at the output side of the first optical fiber 11, and a second lens 23 converges a collimated beam from the line filter 20 and is installed at the input side of the second optical fiber 13.

The line filter 20 transmits a beam of a predetermined wavelength according to an angle between the line filter 20 and the collimated beam incident thereon. Accordingly, a beam of a specific wavelength desired to be transmitted can be selected by controlling the angle of the line filter 20 with respect to the collimated incident beam, using the actuator 15.

The tap unit 30 includes a third optical fiber 35 to which the signal beam from the second optical fiber 13 is transferred, a beam splitter 40 for both transmitting and reflecting the incident beam from the third optical fiber 35, a fourth optical fiber 37 for transferring the beam reflected from the beam splitter 40 to a controller (not shown) which controls the actuator 15, and a fifth optical fiber 39 for transferring the beam transmitted through the beam splitter 40.

The third optical fiber 35 is connected to the second optical fiber 13 by a connector 25, and a third lens 45 which collimates a divergent beam is installed at the output side of the third optical fiber 35. A fourth lens 47 which converges the collimated beam reflected from the beam splitter 40 is installed at the input side of the fourth optical fiber 37, and a fifth lens 49 which converges the collimated beam transmitted through the beam splitter 40 is installed at the input side of the fifth optical fiber 39.

The actuator 15 is driven by the controller according to a detection signal of the beam transmitted through the fourth optical fiber 37. In other words, the angle of the line filter 20 relative to the incident beam can be decided by measuring the amount of the beam the received by an optical detector of the controller. Consequently, the tunable filtering device can transmit only a signal beam of a desired specific wavelength by controlling the angle of the line filter 20.

However, in the prior tunable filtering device, since the tunable filter unit 10 and the tap unit 30 for splitting the incident beam to control the tunable filter unit 10 are separately installed on different bases, the connector 25 for interconnecting the two units 10 and 30 is requisite. Further, since a plurality of lenses and fibers are required, optical alignment between them is difficult, the construction of the device is complicated, and therefore the various optical losses are increased.

SUMMARY OF THE INVENTION

To solve the above problems, it is an objective of the present invention to provide a tunable filtering device for optical communications, which has a simple configuration and an enhanced optical transmission efficiency.

Accordingly, to achieve the above objective, there is provided a tunable filtering device comprising a base; first and second optical fibers installed on the base aligned and facing each other; a tunable filter installed on the optical path between the first and second optical fibers, for transmitting only a beam of a specific wavelength from the beam emitted from the first optical fiber toward the second optical fiber; an actuator driving the tunable filter; a beam splitter installed on the optical path between the tunable filter and the second optical fiber, for reflecting a portion of the beam transmitted through the tunable filter and transmitting the rest; an auxiliary optical fiber installed on the base, for receiving a beam reflected from the beam splitter for further transmission; and a controller detecting the beam transmitted through the auxiliary optical fiber and controlling the actuator according to the detected beam.

Here, the tunable filter is preferably a line filter to selectively transmit a beam of a specific wavelength according to the angle of the tunable filter with respect to an incident beam.

In this case, the actuator includes a DC servo-motor to rotate the tunable filter according to a signal from the controller, and an encoder detecting the angle of the tunable filter by measuring the rotational position of the DC servo-motor.

Further, the first and second optical fibers and the auxiliary optical fiber are preferably each installed in a groove formed in the base.

According to another embodiment of the present invention, the tunable filter is a gradient line filter installed at a constant angle to an incident beam for selectively transmitting a beam of a specific wavelength according to the horizontal and/or vertical position.

In this case, the actuator includes an X–Y movement member for moving the tunable filter in horizontal and/or vertical directions, and driving motors to drive the X–Y movement member.

BRIEF DESCRIPTION OF THE DRAWINGS

The above objective and advantages of the present invention will become more apparent by describing in detail a preferred embodiment thereof with reference to the attached drawings in which:

FIG. 1 is a plan view schematically illustrating a prior tunable filtering device for optical communications;

FIG. 2 is an exploded cutaway perspective view illustrating an embodiment of a tunable filtering device for optical communications, according to the present invention;

FIG. 3 is a sectional view taken along the line III—III of FIG. 2; and

FIG. 4 is an exploded cutaway perspective view illustrating another embodiment of a tunable filtering device for optical communications, according to the present invention.

DETAILED DESCRIPTION OF THE INVENTION

Referring to FIGS. 2 and 3, an embodiment of a tunable filtering device according to the present invention includes first and second optical fibers 51 and 73 aligned and facing each other, a tunable filter 55 installed between the first and second optical fibers 51 and 73 for selectively transmitting a beam of a specific wavelength, and an optical tracking unit to detect a portion of a beam transmitted through the tunable filter 55 to control the tunable filter 55.

The optical tracking unit is provided with a beam splitter 75 installed on the optical path between the tunable filter 55 and the second optical fiber 73 for reflecting a portion of an incident beam in a predetermined direction, an auxiliary optical fiber 71 for transmitting the reflected beam reflected from the beam splitter 75, and a controller 63 for controlling an actuator 60 driving the tunable filter 55 according to a signal beam from the auxiliary optical fiber 71.

The controller 63 includes a photo-detector (not shown) for detecting a beam transmitted through the auxiliary optical fiber 71, and a circuit for controlling the actuator 60 according to the detected.

Here, the first and second optical fibers 51 and 73, the auxiliary optical fiber 71, the tunable filter 55, the beam splitter 75, the actuator 60, are all installed on the one base 1.

The tunable filter 55 is preferably a line filter to transmit a beam of a specific wavelength according to the angle of the tunable filter 55 with respect to the collimated incident beam.

The actuator 60 controlling the angle of the tunable filter 55 is provided with a DC servo-motor 65 for rotating the tunable filter 55 according to a control signal of the controller 63, and an encoder for detecting the angle of the tunable filter 55 with respect to the collimated incident beam.

Preferably, the actuator 60 further includes a speed reducing device 69 for reducing the speed of the DC servo-motor 65. The speed reducing device 69 enables the tunable filter 55 to be finely controlled. The structures of the DC servo-motor 65, the encoder 67, and the speed reducing device 69 are well known. The tunable filter 55 can be rotated by engaging with a fitting groove 68a at the end of the output shaft 68 of the actuator 60 to thereby control the angle of the tunable filter 55.

The beam splitter 75 splits an incident beam into two beams in the predetermined ratio of, for example, 90 to 10 corresponding to a transmitted beam to a reflected beam in the amount of light.

The first and second optical fibers 51 and 73 and the auxiliary optical fiber 71 are installed on the base 1. Preferably, the first and second optical fibers 51 and 73 and the auxiliary optical fiber 71 are seated respectively in the grooves 5a, 5b and 5c formed in the base 1, to be supported thereon. Further, the actuator 60 including the DC servo-motor 65 is preferably installed on a base cover 7 to be assembled onto the base 1. Alternatively, the actuator 60 may be installed under the base 1.

A first lens 61 is installed at the output side of the first optical fiber 51 for collimating the divergent beam emitted from the first optical fiber 51. In addition, second and third lenses 83 and 81 converging the collimated incident beams are installed at the input sides of the second and auxiliary optical fibers 73 and 71, respectively. Here, the first, second and third lenses 61, 83 and 81 are integrally formed with the first, second and auxiliary optical fibers 51, 73 and 71, respectively. Preferably, each of the first, second and third lenses 61, 83 and 81 is a gradient index (GRIN) lens, the refractive index of which varies depending on the distance from the optical axis, and which has a high converging efficiency.

In the operation of a tunable filtering device constructed as above, when a beam including optical signals of various wavelengths is transmitted through the first optical fiber 51, the beam emitted from the first optical fiber 51 diverges. The divergent beam is collimated by the first lens 61 and then enters the tunable filter 55, and the tunable filter 55 transmits a beam of a specific wavelength within a narrow wavelength band. Subsequently, a portion of the beam transmitted through the tunable filter 55 is reflected by the beam splitter 75, converged by the third lens 81, and travels to the controller 63 via the auxiliary optical fiber 71.

Therefore, the DC servo-motor 65 controls the angle of the tunable filter 55 with respect to the incident beam according to the optical signal detected by the photo-detector of the controller 63. At this time, the rotational position of the DC servo-motor 65, that is, the angle of the tunable filter 55 relative to the incident beam, is detected by the encoder 67.

In the meantime, the beam transmitted through the beam splitter 75 is converged by the second lens 83, and then travels via the second optical fiber 73 to another destination of the optical communication system, as the final output of the tunable filtering device.

Another embodiment of a tunable filtering device for optical communications according to the present invention is now explained with reference to FIG. 4. Here the same reference numeral denotes a similar member having a same function as shown in FIGS. 2 and 3.

A tunable filter 155 of this embodiment is installed to make a predetermined angle with a collimated incident beam and is a gradient line filter which selectively transmits a beam of a specific wavelength according to its horizontal and/or vertical movement. In this case, the position of the tunable filter 155 is adjusted by an X–Y actuator 160. A supporting member 168 is supported by the X–Y movement member 165, and the X–Y movement member 165 is moved by horizontal and vertical driving motors 163 and 166.

In addition, the tunable filter 155 is fixed to a fitting groove 168a of the supporting member 168 to be moved horizontally and vertically, and therefore transmits a beam of a specific wavelength according to its position. The operations of the other parts, such as the beam splitter 75, are same as those of the embodiment described above.

According to the present invention, since the first and second optical fibers, the auxiliary optical fiber, the tunable filter, the actuator, and all parts are installed on one base, the construction of the device can be simplified and the optical losses can be minimized.

What is claimed is:

1. A tunable filtering device comprising:

a base;

first and second optical fibers installed on the base, aligned and facing each other;

a tunable filter installed on the optical path between the first and second optical fibers, for transmitting only a beam of a specific wavelength from the beam emitted from the first optical fiber toward the second optical fiber;

an actuator driving the tunable filter;

a beam splitter installed on the optical path between the tunable filter and the second optical fiber, for reflecting a portion of the beam transmitted through the tunable filter and transmitting the rest;

an auxiliary optical fiber installed on the base for receiving a beam reflected from the beam splitter for further transmission; and a controller detecting the beam transmitted through the auxiliary optical fiber and controlling the actuator according to the detected beam.

2. The tunable filtering device as claimed in claim 1, wherein the tunable filter is a line filter to selectively transmit a beam of a specific wavelength according to the angle of the tunable filter with respect to an incident beam.

3. The tunable filtering device as claimed in claim 2, wherein the actuator includes a DC servo-motor to rotate the tunable filter according to a signal from the controller, and an encoder to detect the angle of the tunable filter by measuring the rotational position of the DC servo-motor.

4. The tunable filtering device as claimed in claim 3, wherein the actuator further includes a speed reducing device for reducing the speed of the DC servo-motor.

5. The tunable filtering device as claimed in claim 1, wherein the first and second optical fibers and the auxiliary optical fiber are each installed in a groove formed in the base.

6. The tunable filtering device as claimed in claim 5, wherein the actuator is installed on a base cover to be assembled onto the base.

7. The tunable filtering device as claimed in claim 1, wherein the tunable filter is a gradient line filter installed at a constant angle to an incident beam, for selectively transmitting a beam of a specific wavelength according to a horizontal and/or vertical position.

8. The tunable filtering device as claimed in claim 7, wherein the actuator includes an X–Y movement member for moving the tunable filter in horizontal and/or vertical directions, and driving motors to drive the X–Y movement member.

9. The tunable filtering device as claimed in claim 8, wherein the first and second optical fibers and the auxiliary optical fiber are each installed in a groove formed in the base.

10. The tunable filtering device as claimed in claim 9 wherein the actuator is installed on a base cover to be assembled onto the base.

* * * * *